United States Patent
Klebanov et al.

(10) Patent No.: US 10,844,621 B2
(45) Date of Patent: Nov. 24, 2020

(54) ENHANCED FILTER DOOR

(71) Applicant: ZODIAC POOL SYSTEMS LLC, Carlsbad, CA (US)

(72) Inventors: Aleksandr Klebanov, Bloomfield, NJ (US); Ethan Hanan, Teaneck, NJ (US)

(73) Assignee: ZODIAC POOL SYSTEMS LLC, Carlsbad, CA (US)

( * ) Notice: Subject to any disclaimer, the term of this patent is extended or adjusted under 35 U.S.C. 154(b) by 291 days.

(21) Appl. No.: 15/831,619

(22) Filed: Dec. 5, 2017

(65) Prior Publication Data

US 2018/0163422 A1 Jun. 14, 2018

Related U.S. Application Data

(60) Provisional application No. 62/431,576, filed on Dec. 8, 2016.

(51) Int. Cl.
*E04H 4/16* (2006.01)
*C02F 1/00* (2006.01)
*C02F 103/42* (2006.01)

(52) U.S. Cl.
CPC .......... *E04H 4/1654* (2013.01); *C02F 1/001* (2013.01); *E04H 4/16* (2013.01); *E04H 4/1636* (2013.01); *C02F 2103/42* (2013.01)

(58) Field of Classification Search
CPC ............................... E04H 4/16; E04H 4/1636
See application file for complete search history.

(56) References Cited

U.S. PATENT DOCUMENTS

| | | | |
|---|---|---|---|
| 3,994,260 A | 11/1976 | Fleshman | |
| 4,105,557 A | 8/1978 | Weatherholt | |
| 4,168,557 A | 9/1979 | Rasch et al. | |
| 4,768,532 A | 9/1988 | Johnson | |
| 5,172,445 A | 12/1992 | Chandler | |
| 5,337,434 A * | 8/1994 | Erlich | E04H 4/1654 15/1.7 |
| 7,213,287 B2 | 5/2007 | Hui | |
| 8,110,098 B2 | 2/2012 | Hui | |
| 8,627,532 B2 | 1/2014 | Hui | |
| 9,091,093 B2 | 7/2015 | Londono Correa | |
| 9,366,049 B1 * | 6/2016 | Hui | E04H 4/1663 |

(Continued)

FOREIGN PATENT DOCUMENTS

| | | |
|---|---|---|
| EP | 2186970 A2 | 5/2010 |
| EP | 3333343 | 7/2019 |

OTHER PUBLICATIONS

Communication from European Patent Office for European Application 17205988.3 dated Apr. 30, 2018.

(Continued)

*Primary Examiner* — Michael D Jennings
(74) *Attorney, Agent, or Firm* — Kilpatrick Townsend & Stockton LLP; Dean W. Russell; Renae Bailey Wainwright

(57) ABSTRACT

A filter door for an autonomous, submersible vehicle is disclosed. The filter door includes a living hinge that biases the panel to a closed position. The living hinge may be provided by mesh that extends beyond the periphery of a panel to create a living hinge. The mesh may also prevent dirt and debris from entering or escaping around a pivot edge of the panel. This increases the life span of the filter door and the cleaning efficiency of the autonomous, submersible vehicle.

13 Claims, 5 Drawing Sheets

(56) References Cited

U.S. PATENT DOCUMENTS

| | | |
|---|---|---|
| 2008/0099409 A1 | 5/2008 | Gorelik et al. |
| 2014/0189977 A1* | 7/2014 | Wang ................ A47L 9/009 15/347 |
| 2015/0067974 A1 | 3/2015 | Ben Dov et al. |
| 2015/0191926 A1 | 7/2015 | Tavor et al. |
| 2015/0283483 A1 | 10/2015 | Londono Correa |
| 2016/0168872 A1 | 6/2016 | Hui et al. |

OTHER PUBLICATIONS

EP17205988.3, "Notice of Decision to Grant", dated Jun. 27, 2019, 1 page.

* cited by examiner

ENHANCED FILTER DOOR

CROSS-REFERENCE TO RELATED APPLICATIONS

This application claims priority to and the benefit of U.S. Provisional Patent Application No. 62/431,576, filed Dec. 8, 2016, and entitled "Enhanced Filter Door," the disclosure of which is incorporated herein by reference in its entirety.

FIELD OF INVENTION

The present invention relates to the field of swimming pool cleaners and, in particular, to a filter door for a filter included in a swimming pool cleaner, such as a robotic and/or motorized pool cleaner.

BACKGROUND

In order to automate pool cleaning, many motorized or automatic pool cleaners have been developed. There are many different types of swimming pool cleaners; however, typically, motorized pool cleaners (which are sometimes also referred to as pool cleaning robots) use a pump or suction system to clean a pool. The pump or suction system draws a combination of water and dirt/debris, via an intake, into a filter included or installed in the pool cleaner, such as a filter bag or filter box, that is configured to capture the dirt/debris, thereby cleaning the pool water. In some instances, a pool cleaning robot may include cleaning brushes or pressurized jets to dislodge debris from pool surfaces so that the dislodged dirt/debris can be drawn into the filter (via the intake) by the suction of the pump system. As an example, U.S. Pat. No. 8,434,182, which is incorporated by reference herein in its entirety, discloses an autonomous pool cleaner with high pressure cleaning jets that dislodge dirt/debris from pool surfaces so that the dirt/debris can be drawn into and captured in a filter bag (due to suction created by a pump system).

Often, a filter for a pool cleaner includes an intake port or mount configured to be installed or placed over the intake port of an autonomous robot. The intake port of the filter or the robot may include a flap (also called a "filter door") that is configured to selectively cover the respective intake port. The flap may be opened as the pump system initiates suction so that pool water and there debris therein can enter the filter. Then, when the pump system is turned off and/or before the pool cleaner is removed from the pool, the flap may close the intake port to prevent debris from exiting the filter. In order to allow the flap to move between open and closed positions, the cover is often pivotally coupled to the filter box or filter bag (or the robot). Regardless of how the pivotal coupling is achieved, the pivotal coupling leaves at least a small gap between the body of the filter (or the robot) and the flap; this gap allows for rotation of the flap with respect to the filter (or robot). Consequently, collected debris may escape back into the pool via the gap. Additionally or alternatively, dirt and debris may gather in the gap, thereby preventing or inhibiting the flap from rotating to a closed position. Additionally, dirt and debris that gathers in the gap may wear the edge of the flap (which is often formed from a plastic material) as the flap opens and closes. For example, sand, which is very abrasive, could collect in the gap between the body of the filter (or the robot) and the flap and prematurely wear the body or the flap in this gap area as the flap repeatedly opens and closes.

Moreover, in some embodiments, the flap is attached to the filter box/bag (or robot) via a spring-biased hinge (or other such rotational coupling). However, since the spring is regularly submerged in a body of water, the spring may lose its resiliency and/or corrode. Then, the flap may not close properly and debris may escape the filter and/or robot and re-enter the pool, rendering the pool cleaning robot largely useless (since the cleaner will simply be relocating dirt and debris within a pool).

In at least some instances, a filter and/or pool cleaning robot may include filtered outlets (e.g., sieves) configured to drain the water from filter bag or filter box while limiting the amount of debris that can exit the filter bag or box during this draining. Draining the filter bag or filter box may lighten the filter, reducing the overall weight of the autonomous robot so that a user can easily remove the autonomous robot from a pool. However, these additional outlets may increase the complexity, and thus, the cost of the filters and/or robots. Moreover, each additional outlet added to a filter and/or robot increases the chance of debris exiting the filter and dispersing back into the pool.

In view of at least the aforementioned issues, an enhanced filter door that prevents debris from escaping a filter and/or better filters the escaping water without generating maintenance issues is desirable. Moreover, an enhanced filter door that increases drainage flow from the filter and/or robot (e.g., during removal of an autonomous pool cleaner in which the filter is installed from a pool) is desirable.

SUMMARY

The present invention relates to an enhanced filter door. The filter door includes a living hinge that biases the door to a closed position, eliminating the need for a spring or other such biasing member that might become corroded and/or ineffective after repeated underwater use. Additionally, the filter door may also include mesh that allows water, but not debris, to exit therethrough. In at least some embodiments, the mesh extends beyond the periphery of the filter door, over a pivot edge of a panel of the filter door to prevent dirt and debris from escaping around the pivot edge or becoming lodged therein. Moreover, the portion of the mesh extending over the pivoting edge may acts as the living hinge.

Due at least to the aforementioned features, the present invention avoids problems created by known filter doors/covers/flaps (e.g., allowing dirt/debris to escape and malfunctioning due to a build-up of dirt in a gap adjacent a pivot edge of the door and/or issues associated with spring biasing). Consequently, a pool cleaner using a filter with the filter door presented herein may operate for a longer period of time without filter-door related maintenance (as compared to pool cleaners using filters with typical filter doors/covers). Moreover, since a pool cleaner using a filter with the filter door presented herein (referred to herein as a host pool cleaner) limits the amount of collected debris spilled back into the pool (through or around the filter door), the host pool cleaner may more effectively and efficiently clean a pool. More efficient cleaning may, in turn, reduce the amount of run time required for a pool cleaning robot, thereby extending the life span of other parts or components (e.g., the drive system) of the pool cleaning robot and reducing the costs of operation and maintenance for an end-user.

Still further, since the mesh, which in some cases may be produced by overmolding the hard plastic door frame over the mesh material, allows water to escape from the filter box and/or robot, the filter door may decrease or minimize the number of drains required to be included in the filter box and/or robot, thereby decreasing the complexity (and the cost) of a filter and/or robot. This minimization may also limit the number of parts or pieces that might malfunction, thereby decreasing frustration and maintenance costs for an end-user.

BRIEF DESCRIPTION OF THE DRAWINGS

To complete the description and in order to provide for a better understanding of the present invention, a set of drawings is provided. The drawings form an integral part of the description and illustrate an embodiment of the present invention, which should not be interpreted as restricting the scope of the invention, but just as an example of how the invention can be carried out. The drawings comprise the following figures.

DETAILED DESCRIPTION

The following description is not to be taken in a limiting sense but is given solely for the purpose of describing the broad principles of the present invention. Embodiments of the present invention will be described by way of example, with reference to the above-mentioned drawings showing elements and results according to the present invention.

Generally, the filter door for an autonomous pool cleaner presented herein includes a living hinge that biases the door to a closed position and a mesh that covers openings in the door. Consequently, the openings allow water, but not dirt and debris to pass therethrough when the door is in a closed position. In other words, the mesh acts a sieve that allows for drainage. In some embodiments, the mesh that extends beyond the periphery of a panel, which may be formed by overmolding (for example, by overmolding the panel onto the mesh) or other attachment methods, prevents dirt and debris from escaping around a pivot edge of the panel and also creates the living hinge. However, in other embodiments, the living hinge may be formed in any manner with any material (e.g., plastic extensions may extend beyond a periphery of the panel).

Other pool cleaners and or filters may also include filter doors; however, typically, the filter doors are biased by a spring or other such mechanism that may corrode or malfunction over time. Moreover, other filter doors typically allow dirt and debris to pass through and/or enter a gap that allows the filter door to rotate or pivot. This allows dirt and debris back into the pool (which then necessitates additional cleaning) and/or allows dirt and debris to build up in the gap. As referenced above, over time, this build-up may cause the filter door to malfunction, be damaged, and possibly rendering the filter door useless. By comparison, the filter door presented herein prevents dirt and debris from entering or passing through such a gap and does not include any springs or other such mechanisms. Consequently, the filter door presented herein increases the life span of the filter door and the cleaning efficiency of the autonomous, submersible vehicle on which it is utilized.

Figure 1:
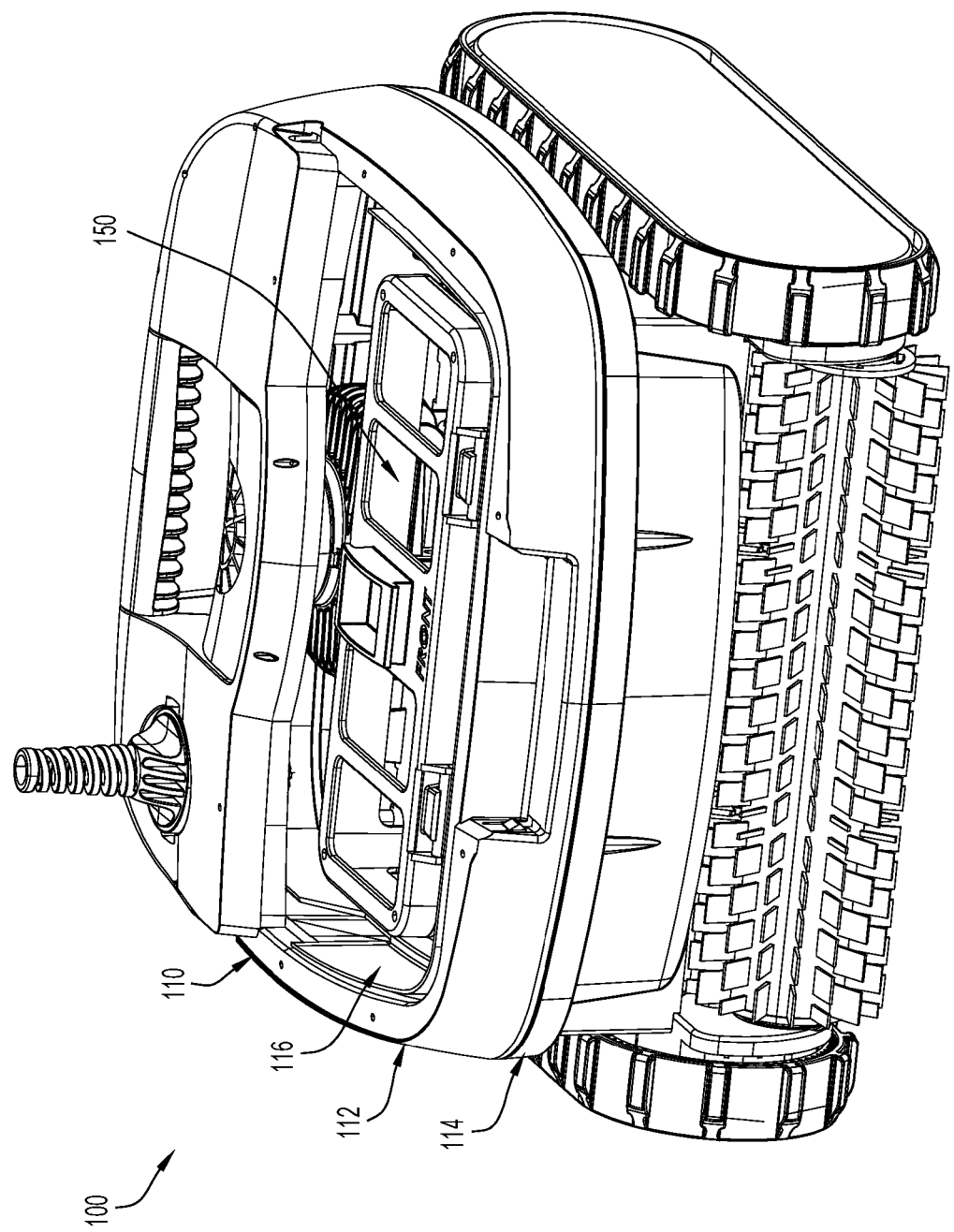
FIG. 1 is a top perspective view of an example autonomous swimming pool cleaner. A portion of a chassis included in the autonomous swimming pool cleaner is removed to show a filter box that is installed within the pool cleaner. The filter box includes an enhanced filter door configured in accordance with an exemplary embodiment of the present invention.
Figure 2:
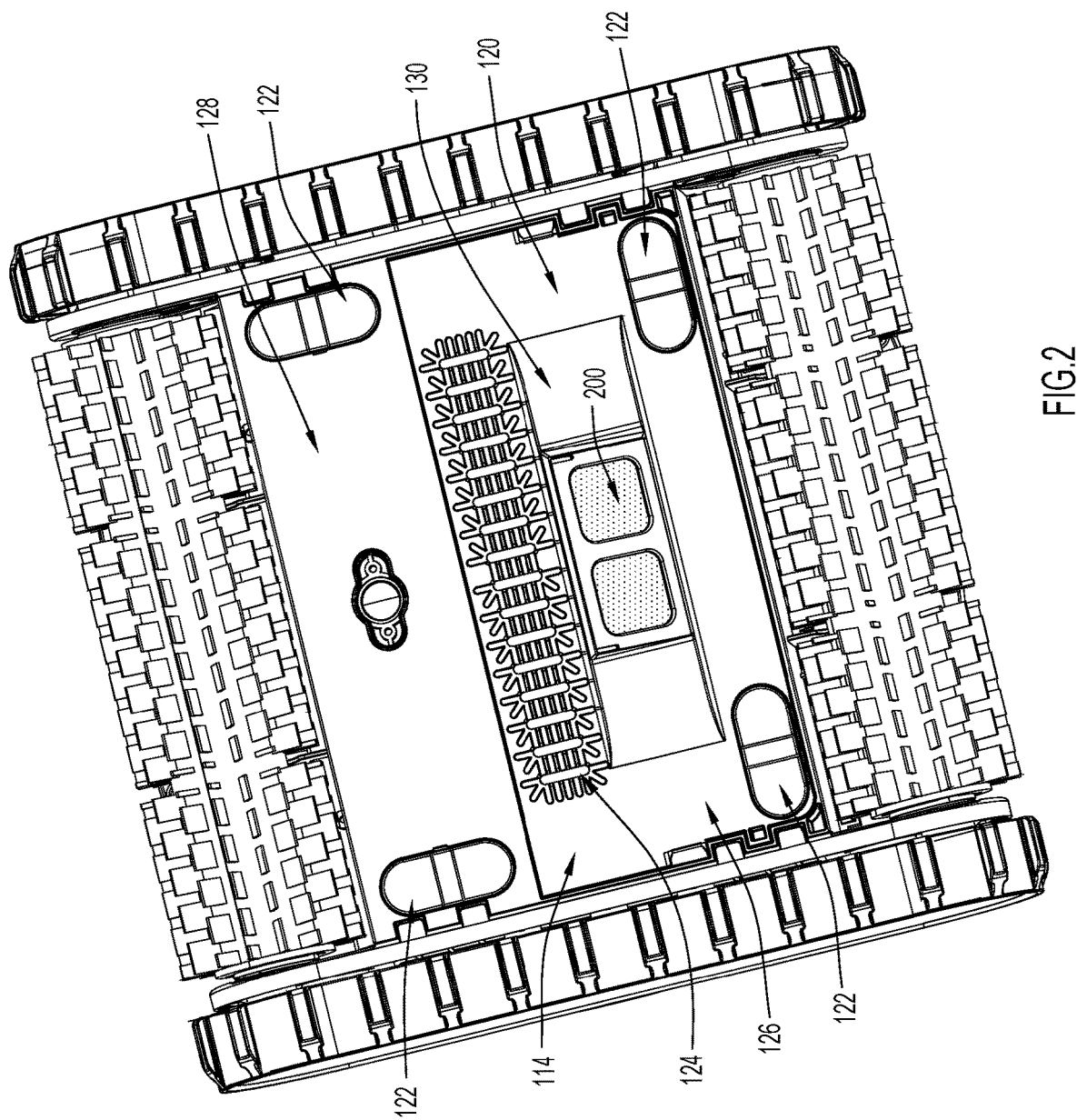
FIG. 2 is a bottom perspective view of the autonomous swimming pool cleaner of FIG. 1, showing the enhanced filter door covering an intake port included in the chassis.
Figure 3:
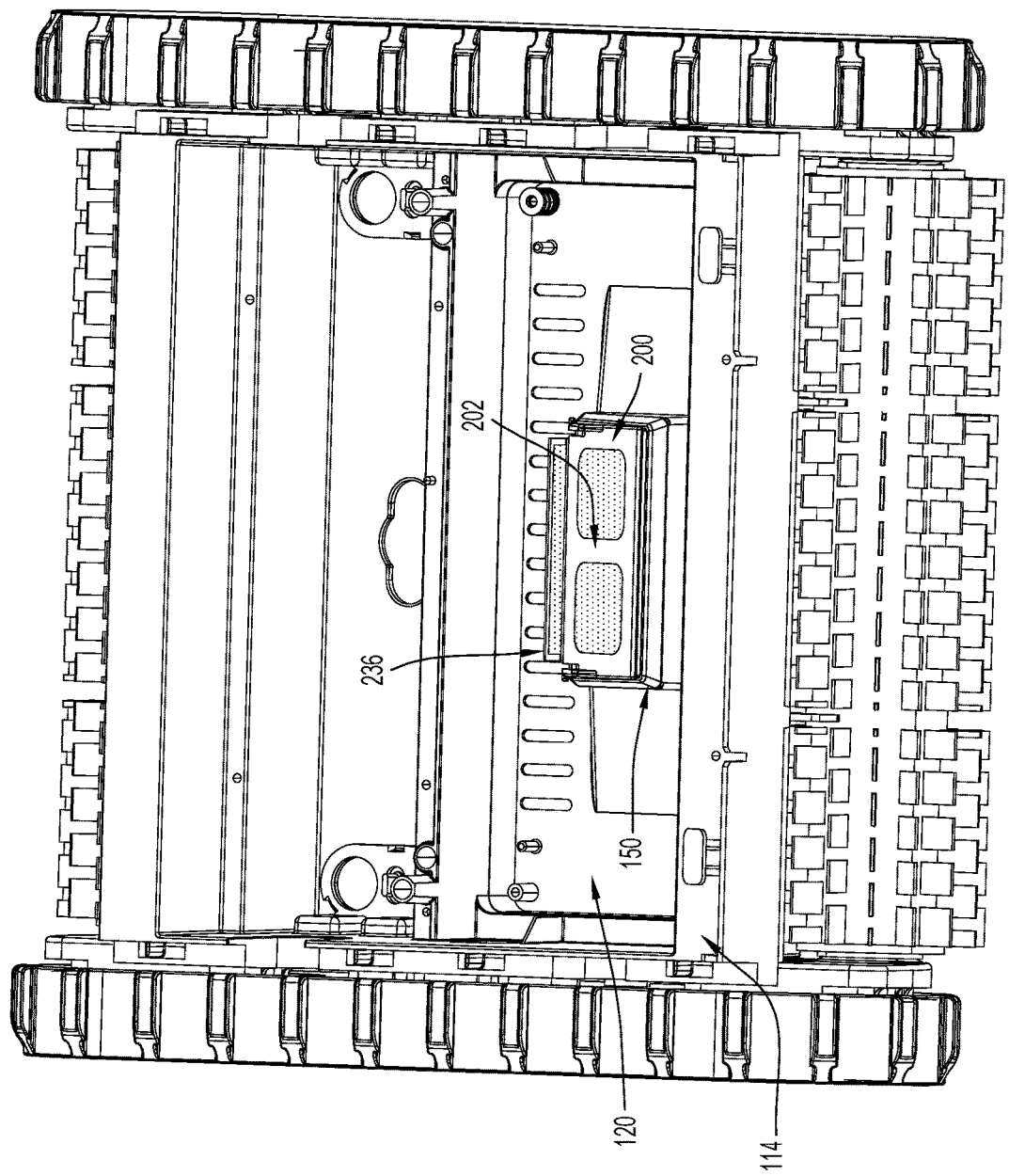
FIG. 3 is a top, sectional view of the autonomous swimming pool cleaner of FIG. 1. The filter box has been removed from this illustration to show the filter door installed in the intake port with greater clarity.

Now referring to FIG. 1 for a high-level description of an autonomous pool cleaner 100 including a filter box 150 with a filter door 200 configured in accordance with the present invention (FIGS. 2-3 show the filter door 200 from below and from above with the filter box 150 removed, respectively). In the depicted embodiment, the autonomous pool cleaner 100 includes a main body 110 with an upper chassis 112 and a lower chassis 114. The upper chassis 112 is configured to provide access to an interior cavity 116 that is collectively defined by the upper chassis 112 and the lower chassis 114 (e.g., the upper chassis 112 includes a removable or movable portion that can be removed or moved to provide access to the interior cavity 116). The interior cavity 116 is configured to receive a filter, such as filter box 150 and may also house a pump system that is configured to draw fluid (e.g., water), together with any dirt or debris floating therein, into the filter when the filter is installed in the interior cavity 116.

Now referring to FIGS. 2 and 3, but with continued reference to FIG. 1, in the depicted embodiment, the lower chassis 114 of the autonomous vehicle 100 includes a base plate 120. The base plate 120 includes a first section 126 and a second section 128. The second section 128 is generally configured to support a pump system and/or drive system included in the autonomous vehicle 100 (neither of which are shown for simplicity's sake). However, in other embodiments, the pump system need not be disposed in the autonomous robot in order to draw fluid (and debris) into the filter via the intake port. For example, the pump system could be disposed in a housing disposed outside of a pool and the suction could be imparted to the autonomous robot via tubing or a tether. Meanwhile, the first section 126 includes an intake port 130 and is generally configured to support a filter in a position that places the filter in fluid communication with the intake port 130 for a pump system. Consequently, as a pump system draws fluid and dirt/debris into the interior cavity 116, the fluid and dirt/debris enters the filter (e.g., filter box 150).

In the particular embodiment depicted in the Figures, the filter is configured as a filter box 150 and sits atop of the intake port 130; however, this is merely an example filter that may include the enhanced filter door 200 of the present invention. In other embodiments, the enhanced filter door 200 may be installed or included on any filter (e.g., a filter box or bag) of any size or shape (including replaceable/removable filters and filters that are permanently installed in an autonomous pool cleaner). For simplicity, the filter door 200 is largely described herein in association with a filter, such as filter box 150; however, it is to be understood that the filter door 200 could also be installed directly onto the chassis of an autonomous vehicle, if desired (e.g., the vehicle could collect dirt and debris without a typical filter installed therein).

Regardless of how the filter door 200 is included or installed in an autonomous vehicle (e.g., installed directly onto the autonomous pool cleaner or installed onto a filter that is subsequently installed or placed in an autonomous pool cleaner), the filter door 200 is configured to selectively cover an intake port 130 included on the autonomous vehicle to restrict or control flow of dirt and debris into and out of a filter and/or autonomous pool cleaner. Consequently, the intake port 130 and the filter door 200 may be sized to mate and configured to allow the filter door 200 to selectively seal the intake port 130 (at least with respect to dirt and debris).

In the depicted embodiment, the first section 126 of the base plate 120 (of the lower chassis 114) may be interchangeable or replaceable (with other first sections/plates 126) to provide intake ports 130 of different shapes/sizes. Consequently, the autonomous robot 100 can utilize filters with doors 200 of different sizes or shapes (since many different filters, such as bags and boxes of different sizes, may require intake ports 130 of different sizes, shapes, and/or locations). Additionally or alternatively, the filter door 200 (and/or the filter) may be sized/shaped for a particular intake port, provided that the intake port 130 and filter door 200 maintain specific points of reference (with respect to each other) that allow the filter door 200 to selectively cover the intake port 130 in a manner that prevents dirt and debris from escaping the filter. That is, a panel 202 (see FIGS. 3-5) of the filter door 200 may extend across the intake port 130 when the door 200 is in a closed position (e.g., the panel may span the length and width of a rectangular intake port).

Still referring to FIGS. 2-3, in the depicted embodiment, base plate 120 includes a number of drains 122 covered with one-way valves (e.g., reed valves) and/or screens. Additionally, the first segment 126 includes a drainage vent 124 that may also include a one-way valve (although the one-way valve may be disposed on an interior surface of the base plate 120, instead of the exterior surface of the base plate 120 like the one-way valves or screens included on drains 122). Generally, drains 122 and vent 124 may assist the filter door 200 in draining water, but not dirt/debris, from the interior cavity 116 of the autonomous robot 100. Consequently, each of drains 122 and vent 124 may include a sieve or filter (such as a fine mesh material) that allows water, but not dirt, to pass therethrough. Then, when the autonomous robot 100 is being removed from a body of water (e.g., a pool), water may drain from the interior cavity 116 to reduce the weight of the robot 100 and make the robot easier to remove from the water. As is discussed below, in at least some embodiments, the features of the enhanced filter door 200 may eliminate the need for drains 122 and vent 124 (and any other such features); but in other embodiments, these features may assist the filter door 200 in draining the autonomous pool cleaner 100.

Figure 4:
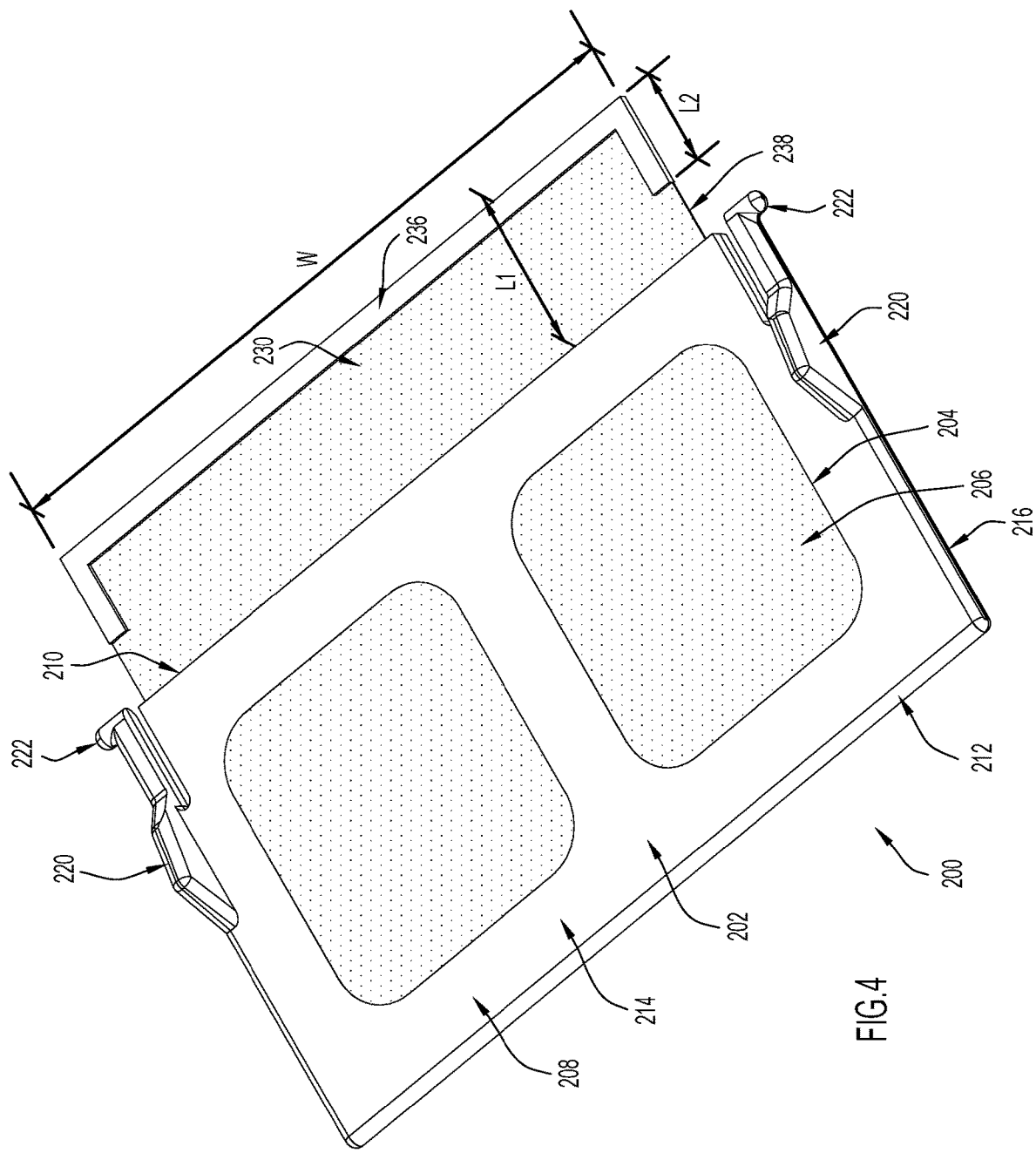
FIG. 4 is a top perspective view of the enhanced filter door included in the filter box of the autonomous swimming pool cleaner of FIG. 1.

Now turning to FIG. 4 (but still with some reference to FIG. 3), the enhanced filter door 200 includes a panel 202 with a support structure 208 (e.g., main body) that extends between a first edge 210, that is referred to herein as a pivot edge 210, and a second edge 212, that is referred to herein as a distal or operative edge 212. As the naming implies, the distal or operative edge 212 is configured to move or rotate about the pivot edge 210 in order to selectively close (e.g., operate) an intake port included on an autonomous pool cleaner and/or filter. That is, the distal or operative edge 212 is configured to move or rotate about the pivot edge 210 in order to selectively move the door 200 into a closed position.

The support structure 208 also defines one or more drainage openings 204 (the depicted embodiment includes two openings 204) that extend through the panel 202 (e.g., from a top surface 214 to a bottom surface 216) and these drainage openings 204 may be covered by mesh 206. For example, in some embodiments, the support structure 208 may be overmolded over a panel of mesh 206 so that the mesh 206 is disposed on the bottom surface 216 of the panel 202 and spans the drainage openings 204. Alternatively, in other embodiments the mesh 206 may be attached to the bottom surface 216 in any desirable manner. Additionally or alternatively, the mesh 206 may be attached to the top surface 214 in any desirable manner, provided that the positioning of the filter door 200 is adjusted accordingly (as is discussed in further detail below in connection with FIG. 5).

Still referring to FIG. 4, a portion of mesh 206 also extends beyond the support structure 208 to form an extension 230 that extends beyond a periphery of the panel 202. In particular, the mesh 206 extends beyond the pivot edge 210 of the support structure 208. The extension 230 includes a frame member 236 that may be formed from a rigid plastic material, like that of the support structure 208.

The frame member 236 extends along the width W of an distal edge (i.e., an exterior edge) of the extension 230 in order to provide at least a portion of the extension 230 with some rigidity or structural definition. However, the frame member 236 does not extend the entire length of the periphery of extension 230. Instead, the extension 230 extends a first distance or length L1 beyond the pivot edge 210 of the support structure 208 of the panel 202 and the frame member 236 extends a distance L2 from the distal edge of the extension 230 (e.g., the edge of the extension 230 furthest from the pivot edge 210). Distance L2 is shorter than distance L1. Consequently, the extension 230 includes a section 238 that is flexible and free to rotate or move (since this section only comprises mesh 206).

The mesh 206 forming the extension 230 and covering the openings 204 is or acts as a sieve/filter and includes sieve openings that are sized to filter dirt and debris (e.g., retain dirt and debris within the filter area) while allowing fluids, such as water, to pass therethrough. Consequently, when the support structure 208 of the panel 202 is sealed around or onto an intake port 130 (e.g., positioned against the intake port 130), the panel 202 may prevent any dirt and debris from escaping directly through the intake port 130. That is, the mesh 206 may capture or retain dirt and debris. Meanwhile, the mesh 206 of the extension 230 may prevent any dirt or debris from escaping around the pivot edge 210 of the panel 202. Consequently, the filter door 200 may completely seal an intake port 130 with respect to any dirt and debris that is larger than the sieve openings included in the mesh 206. Moreover, due to the natural resiliency of the mesh 206 and the positioning of the extension 230, which is explained in further detail in connection with FIG. 5, the flexible section 238 of the extension 230 provides a living a hinge that biases the door 200 to a closed position with respect to a corresponding intake port 130. However, in other embodiments, the flexible section 238 may include or be formed by other materials or components (i.e., plastic components) that provide or enhance the living hinge.

Still referring to FIG. 4, in at least some embodiments, the filter door 200 may also include a rotatable coupler or couplers 220. In this particular embodiment, the filter door 200 includes a rotatable coupler 220 on each side of the panel 202 and each coupler 220 includes a protrusion or hinge 222. Each protrusion or hinge 222 is configured to engage a corresponding hole included in a filter to rotatably mount the filter door 200 to the filter. Then, together, the living hinge provided by the flexible section 238 of the extension 230 and the couplers 220 may control the rotation and position of the filter door 200. However, in other embodiments, the filter door 200 may not include couplers 220 and, instead, may be rotatably coupled to a filter (or an autonomous vehicle) via only the living hinge provided by the flexible section 238 of the extension 230 (or a living hinge provided by other materials or components disposed in or on the flexible section).

Figure 5:
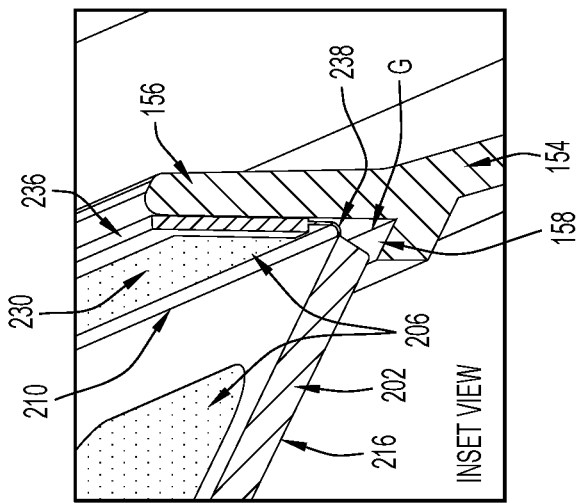
FIG. 5 is a side, sectional view of the filter box and enhanced filter door included in the autonomous swimming pool cleaner of FIG. 1.
Figure 5:
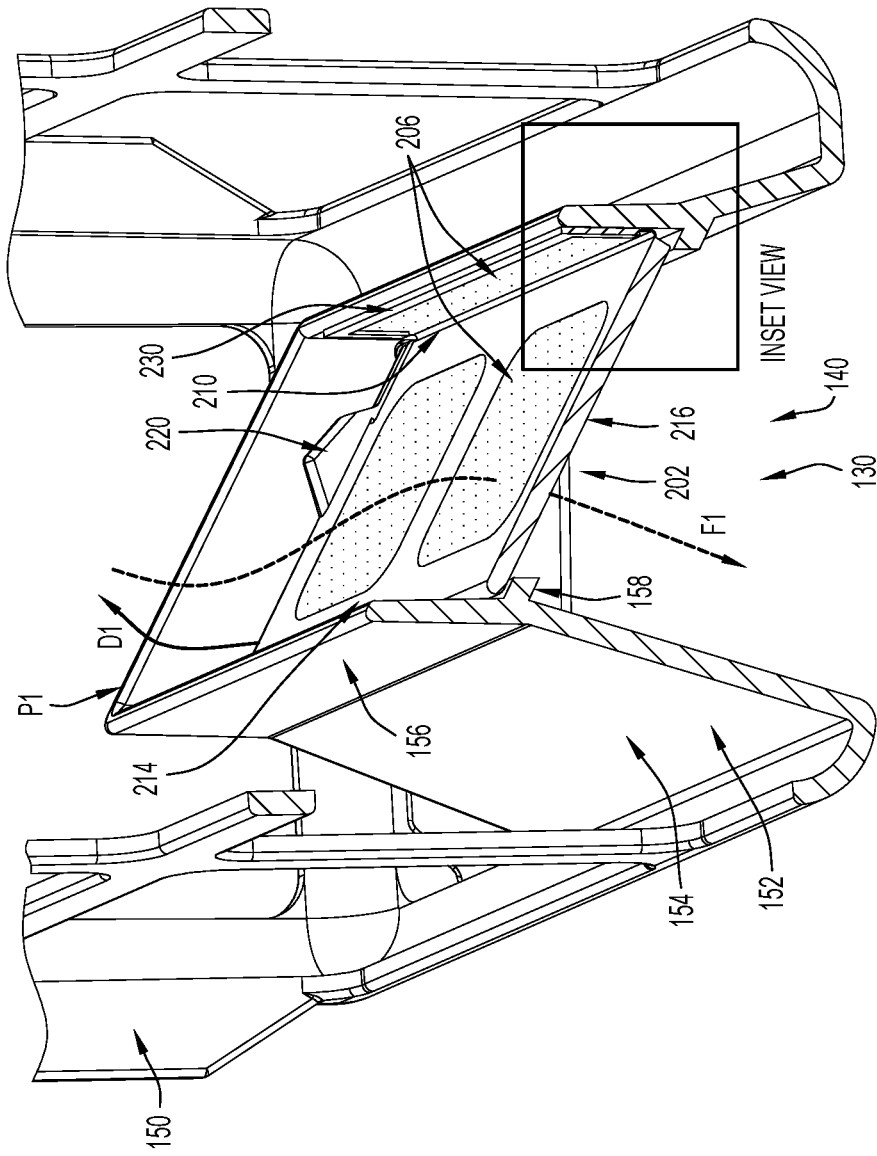

Now referring to FIG. 5, a sectional view of the filter box 150 is shown to illustrate an example connection between an example of the filter door 200 of the present invention and a filter. In the depicted embodiment, the filter box 150 includes a mount or engagement portion 152 configured to engage (e.g., be positioned over) the intake port 130 of an autonomous vehicle. The mount 152 includes a first section 154 and a second section 156 that extends above the first section 154. The mount 152 also includes a support ledge 158 disposed adjacent a transition point between the first section 154 and the second section 156.

The first section 154 of the mount comprises an annular wall with an inwards taper (e.g., decreasing diameter towards the second section 156) so that the first section 154 defines an opening 140 configured to receive and/or secure the filter 150 to the intake port 130 of the autonomous vehicle 100 (shown in FIG. 1). The support ledge 158 provides an annular ledge that is disposed in, adjacent to, or abutting the opening 140. The support ledge 158 is configured to support the filter door 200 when the filter 200 is in a closed position P1, thereby allowing the filter 200 to control the flow of debris between the intake port 130 and the filter 150. The second section 156 of the mount 152 is also an annular wall, but includes generally vertical walls that allow the filter door to rotate out of the closed position P1 (in direction D1) to selectively open the filter box 150 to receive dirt and debris from the intake port 130.

The filter door 200 is sized to span the entire mount 152 so that, in the closed position P1, the filter door 200 seals the filter 150 and/or intake port 130 and prevents collected dirt and debris from escaping the filter 150 and dispersing back into a pool. Moreover, as can be seen best in the inset view included in FIG. 5, the extension 230 extends along a wall of the second section 156 of the mount 152 and prevents dirt and debris from entering or escaping through a gap "G" between the pivot edge 210 and the mount 152.

Since the mesh 206 is included on the bottom surface 216 of the panel 202 (e.g., the panel is overmolded onto a top surface of the mesh 206), the upward (and substantially vertical) mounting of the extension 230, onto or against the second section 156 of the mount 152, compresses/folds the flexible section 238 of the mesh 206 against its natural resiliency (if the mesh 206 is included on the top surface 214, the door 200 may be mounted upside-down to create the same compression). Consequently, if the panel 202 is rotated open in direction D1, the rotation further compresses/folds the mesh 206 and creates a counteracting force that biases the panel 202 back to its closed position P1. Put another way, the living hinge provided by the flexible section 238 of the extension 230 may bias the door 200 to its closed position P1, in which the door 200 seals/encloses dirt and debris within the filter box 150. In at least some embodiments, the frame member 236 of the extension may be secured to the second section 156 of the mount 152 in order to prevent the extension 230 from slipping (with respect to the second section 156 of the mount 152) and ensure that a biasing force is generated by movement of the panel 202 in direction D1 (the biasing force acting in an opposite direction to direction D1).

Due to the aforementioned aspects of the filter door 200 of the present invention, during the shutdown operation of a pump or suction system included in an autonomous robot, the filter door 200 may effectively and efficiently seal dirt and debris within the autonomous robot and/or a filter installed therein. More specifically, once the pump or suction system creates enough suction into the robot (e.g., above a suction threshold), the pressure of the water flow against the straining effect of the mesh 206 of the filter door 200 and/or suction may cause the filter door 200 to rotate in direction D1. With the filter door 200 open, dirt and debris floating in the water may be drawn through opening provided by the open filter door 200, into a robot and/or filter (due to suction from the pump or suction system). However, as the suction/pressure decreases (such as when the pump is turned off, for instance, to remove the robot from the pool, the natural resiliency of the living hinge provided by the flexible section 238 of extension 230 will urge the panel 202 back towards its closed position P1.

Once the suction/pressure drops beneath a threshold, the biasing force of the living hinge provided by the flexible section 238 will overcome the opening force generated by the pressure and close the door 200, sealing any dirt and debris within the autonomous robot and/or filter. The mesh 206 included on the panel 202 may then allow any water in the robot to flow out of the filter and/or robot, as shown by flow F1, but will prevent any dirt and debris from escaping. Since the door 200 includes its own drainage system, the door 200 may, in some instances, replace at least some drains or vents that are typically included in pool cleaners.

Advantageously, the filter door 200 is biased to a closed position P1 due to the natural resiliency of the mesh 206 and the positioning of the extension 230. Consequently, biasing members that are liable to malfunction and/or corrode, such as springs, need not be used with the filter door and the filter door may function properly for a long life span. Moreover, since the extension 230 prevents dirt and debris from escaping around the pivot edge 210 of the panel 202 or entering a gap G between the pivot edge 210 and the filter box 150 (or between the pivot edge 210 and the robot 100), the filter door 200 will be less likely to malfunction or deteriorate, as compared to typical filter doors that allow dirt and debris to enter, escape, or be trapped in and around a pivot edge.

To summarize, in one form, a filter door for an autonomous, submersible vehicle includes mesh material that extends beyond the periphery of a panel to create a living hinge. The living hinge biases the panel to a closed position while also allowing water to drain and yet preventing dirt and debris from escaping around a pivot edge of the panel. This increases the life span of the filter door and the cleaning efficiency of the autonomous, submersible vehicle.

In another form, a filter door for an intake port of a filter for a swimming pool cleaner is provided and comprises: a support structure with a pivot edge and a distal edge that rotates about the pivot edge in order to selectively move the support structure between a closed position that closes the intake port and an open position that opens the intake port; a mesh attached onto a surface of the support structure; and a living hinge that biases the filter door to the closed position.

In yet another form, an autonomous swimming pool cleaner is provided herein, the autonomous swimming pool cleaner, comprising: a chassis defining an intake port; a filter that is removably positionable over the intake port, the filter including a door that comprises: a pivot edge and a distal edge that rotates about the pivot edge in order to selectively move the door between a closed position that closes the intake port and an open position that opens the intake port; and a mesh attached onto a surface extending between the pivot edge and the distal edge, the mesh providing a living hinge that biases the door to the closed position.

While the invention has been illustrated and described in detail and with reference to specific embodiments thereof, it is nevertheless not intended to be limited to the details shown, since it will be apparent that various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

It is also to be understood that the pool cleaner described herein, or portions thereof may be fabricated from any suitable material or combination of materials, such as plastic, foamed plastic, wood, cardboard, pressed paper, metal, supple natural or synthetic materials including, but not limited to, cotton, elastomers, polyester, plastic, rubber, derivatives thereof, and combinations thereof. Suitable plastics may include high-density polyethylene (HDPE), low-density polyethylene (LDPE), polystyrene, acrylonitrile butadiene styrene (ABS), polycarbonate, polyethylene terephthalate (PET), polypropylene, ethylene-vinyl acetate (EVA), or the like. Suitable foamed plastics may include expanded or extruded polystyrene, expanded or extruded polypropylene, EVA foam, derivatives thereof, and combinations thereof.

Finally, it is intended that the present invention cover the modifications and variations of this invention that come within the scope of the appended claims and their equivalents. For example, it is to be understood that terms such as "left," "right," "top," "bottom," "front," "rear," "side," "height," "length," "width," "upper," "lower," "interior," "exterior," "inner," "outer" and the like as may be used herein, merely describe points of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

Similarly, when used herein, the term "comprises" and its derivations (such as "comprising", etc.) should not be understood in an excluding sense, that is, these terms should not be interpreted as excluding the possibility that what is described and defined may include further elements, steps, etc. Meanwhile, when used herein, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially".

The invention claimed is:

1. An autonomous swimming pool cleaner, comprising:
   a chassis defining an intake port;
   a filter that is removably positionable over the intake port, the filter including a door that comprises:
      a pivot edge and a distal edge that rotates about the pivot edge in order to selectively move the door between a closed position that closes the intake port and an open position that opens the intake port; and
      a mesh attached onto a surface located between the pivot edge and the distal edge; and
      a living hinge that biases the door to the closed position.

2. The autonomous swimming pool cleaner of claim 1, wherein the filter is in fluid communication with the intake port and the door is configured to control a flow of debris between the filter and the intake port.

3. The autonomous swimming pool cleaner of claim 1, further comprising:
   a pump system configured to draw water and debris into the filter via the intake port, wherein, in the open position, the door allows the water and debris to enter the filter via the intake port and, in the closed position, the door retains the debris in the filter while allowing the water to exit the filter.

4. The autonomous swimming pool cleaner of claim 3, wherein the living hinge biases the door to the closed position when pressure from the water and debris drawn into the intake port is below a pressure threshold.

5. The autonomous swimming pool cleaner of claim 1, wherein the mesh comprises:
   an extension that extends beyond a periphery of the surface.

6. The autonomous swimming pool cleaner of claim 5, wherein the extension extends beyond the pivot edge of the door to prevent debris from exiting the filter around the pivot edge when the door is in the open position, the closed position, and positions therebetween.

7. The autonomous swimming pool cleaner of claim 5, wherein the pivot edge of the door is disposed in a gap to allow rotation of the door with respect to the filter and the extension prevents debris from entering the gap.

8. The autonomous swimming pool cleaner of claim 5, wherein the extension comprises:
   a frame member that extends along a distal edge of the extension; and
   a flexible section disposed between the frame member and the distal edge of the door, wherein the flexible section provides the living hinge.

9. The autonomous swimming pool cleaner of claim 1, wherein the door further comprises:
   drainage openings, wherein the mesh spans the drainage openings.

10. The autonomous swimming pool cleaner of claim 1, wherein the door does not include a biasing member.

11. An autonomous swimming pool cleaner, comprising:
   a chassis defining an intake port;
   a filter that is removably positionable over the intake port, the filter including a door that comprises:
      a support structure with a pivot edge and a distal edge that rotates about the pivot edge in order to selectively move the support structure between a closed position that closes the intake port and an open position that opens the intake port;
      a mesh attached onto a surface of the support structure; and
      a living hinge that biases the door to the closed position.

12. The autonomous swimming pool cleaner of claim 11, the door further comprising an extension that extends beyond the pivot edge of the door, wherein the extension comprises a flexible section that provides the living hinge.

13. The autonomous swimming pool cleaner of claim 12, wherein the extension extends beyond the pivot edge of the door to prevent debris from exiting the filter around the pivot edge when the door is in the open position, the closed position, and positions therebetween.

* * * * *